United States Patent Office 3,443,216
Patented May 6, 1969

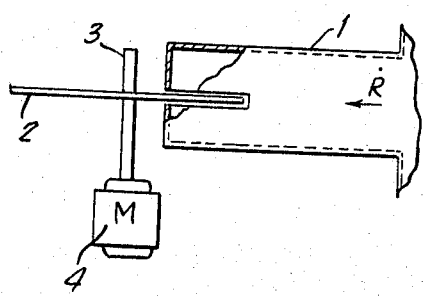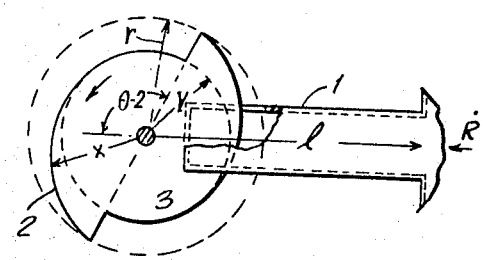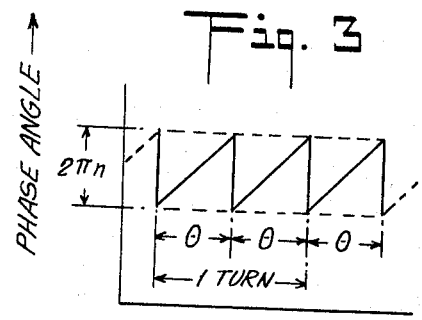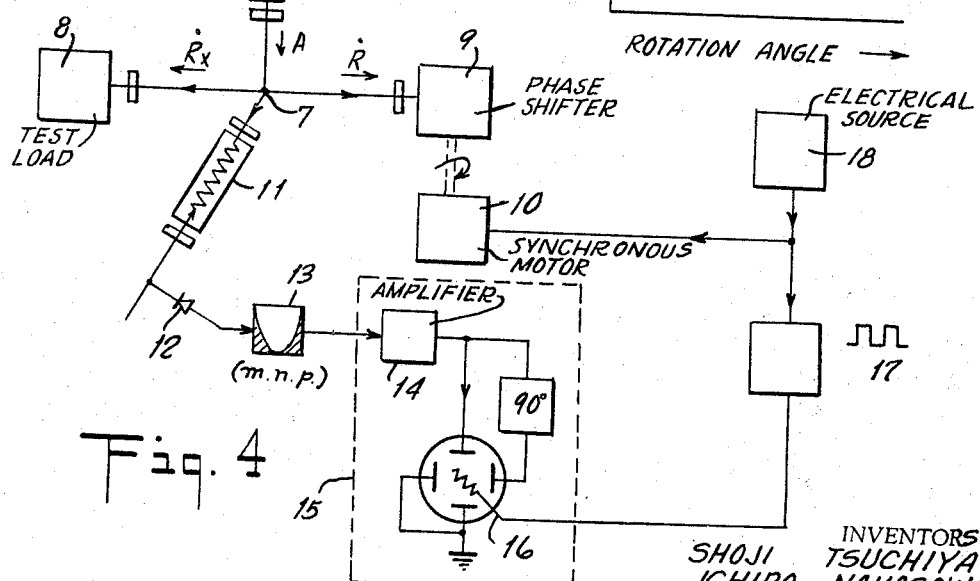

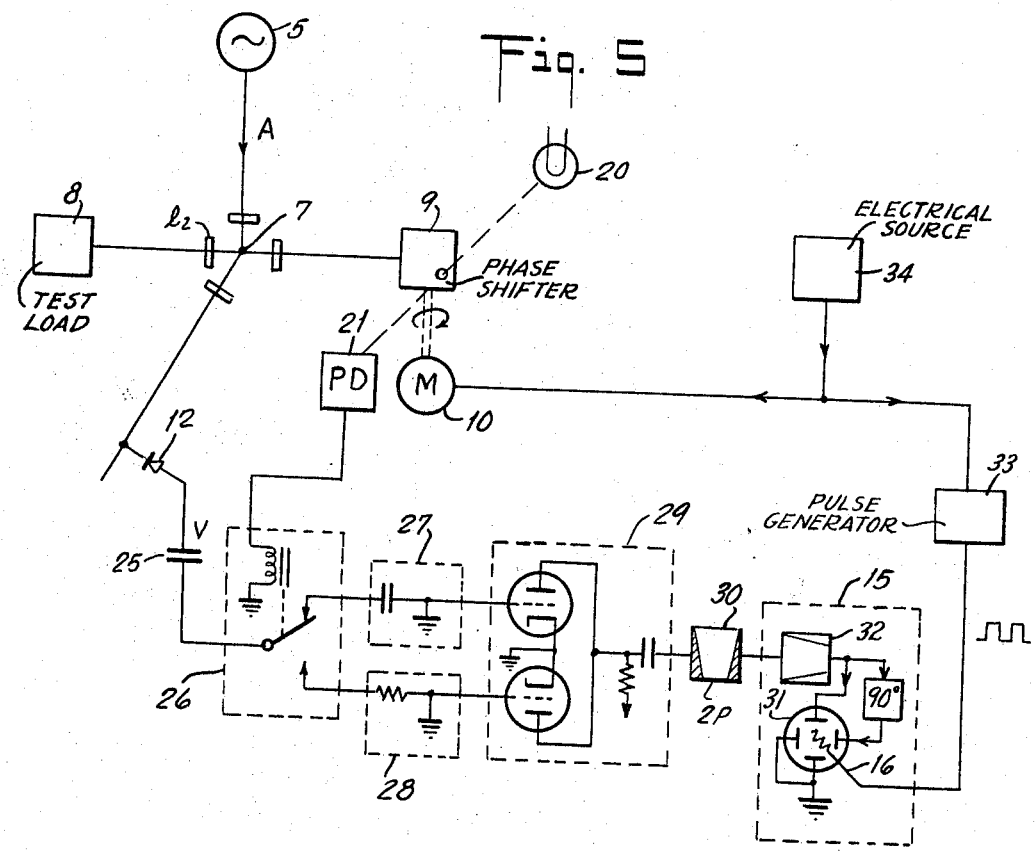

3,443,216
MICRO-WAVE PHASE SHIFTER AND
CIRCUIT THEREFOR
Shoji Tsuchiya and Ichiro Nakagawa, Tokyo, Japan, assignors to Nippon Telegraph & Telephone Public Corporation, Tokyo, Japan, a corporation of Japan
Filed Aug. 20, 1964, Ser. No. 390,805
Int. Cl. G01r 27/04; H03b 3/04
U.S. Cl. 324—58                                    1 Claim

ABSTRACT OF THE DISCLOSURE

A micro-wave phase shifter for use in waveguides and comprising a rotatable disc having an electrically conductive periphery which is divided into identical sectors, the radius of each of which increases linearly with rotation by an amount equal to an integral number of half-wave lengths supportable in the waveguide; and a micro-wave impedance plotter comprising means for supplying microwave energy from a common source to be reflected off the phase shifter, a test specimen, detector means arranged to detect the modulation effect produced upon combining of the reflected waves, and means for synchronizing a display of the detector output with adjustments of the phase shifter.

---

This invention relates to a novel micro-wave phase shifter and to an impedance plotter using such a phase shifter.

Most prior art phase shifters for waveguide circuits in the very high frequency bands were phase shifters of the wave transmission type, wherein the waves passing through the phase shifter are phased.

The invention concerns a phase shifter of the reflection type, wherein electromagnetic waves are phased by means of controllable reflectors. Among the various features of the present invention are the following: It is possible to change phase linearly and at a high speed. The frequency sensitivity of the phase shifter is very low so that it can be used over a greater band width. It is particularly useful in connection with very small waveguides such as are used in the millimeter wave length region. It is applicable not only to rectangular waveguides, but to circular waveguides as well. It is easily adjusted and lends itself well to conventional production.

Because of these features, a number of variations of the instruments of this type are possible for the purpose of measurement and plotting which have been impossible with the instruments heretofore known. The invention makes possible a direct reading plotter for impedance for waveguides with a very simple structure and many practical advantages.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claim appended hereto. Those skilled in the art will appreciate that the conception upon which this disclosure is based may readily be utilized in a variety of ways for carrying out the several purposes of the invention. It is important, therefore, that the claim be regarded as including such equivalent ways as do not depart from the spirit and scope of the invention.

Certain specific applications of the invention are shown in the accompanying drawings and are described in the following portions of the specification.

In the drawings:

FIG. 1 is a plan view illustrating a micro-wave shifter according to the present invention;

FIG. 2 is a side elevational view of the phase shifter of FIG. 1;

FIG. 3 is a plot illustrating the operating characteristics of the phase shifter of FIGS. 1 and 2;

FIG. 4 is a schematic showing one arrangement of an impedance plotter incorporating the phase shifter of FIGS. 1 and 2;

FIG. 5 is a schematic showing an alternate arrangement of an impedance plotter incorporating the phase shifter of FIGS. 1 and 2;

FIG. 6 is a plan view illustrating a modified phase shifter according to the present invention;

FIG. 7 is a side elevational view of the phase shifter of FIG. 6.

The micro-wave phase shifter of FIG. 1 comprises a rectangular waveguide 1 in which is mounted a rotating disk 2. The disk is made of an electrically conductive material and is placed in the center of the waveguide at the position of maximum electric field so as to effectively reflect electromagnetic waves propagating down the guide toward the disk. The rotating disk is turned at a certain speed by means of a synchronous motor 4 around an axis 3. The rotating disk 2 is formed as shown in FIG. 2. That is, its periphery varies between the radius of a pair of inner and outer circles shown as $r_1$ and $r_2$ respectively. $\lambda_g$ represents the guide wave length at the designed center frequency. In this case $$r_2 - r_1 = n \frac{\lambda_g}{2} \quad (n=1, 2, 3 \ldots) \tag{1}$$

Now dividing the rotating disk into $m$ number of sectors of equal dimension ($m=1, 2, 3 \ldots$) (FIG. 2 shows a case where $m=2$), the distance $r$ from the revolving center to the edge of the disk in each sector, is so arranged that it, beginning from $r_1$ and increasing the radius in proportion to the angle of the sector, ends at $r_2$. Then in each of these sectors:

$$r = r_1 + (r_2 - r_1) \frac{\theta_m}{2\pi} = r_1 + \frac{\lambda_g}{4\pi} m \cdot n \cdot \theta \tag{2}$$

when $$0 < \theta < \frac{2\pi}{m}$$

When the rotating disk 2 is fitted into a slit made at the center of upper and lower surfaces of the waveguide, as shown in FIG. 1, and when the disk is turned, the complex reflection coefficient R becomes, in conformity with the Formula 2 when observed from the opening surface of said waveguide, as follows against the designed center frequency:

$$R = |R| \exp (j\eta) \exp \left( \left\{ -j2\frac{2\pi}{\lambda_g}(l-r) \right\} \right)$$

$$= + |R| \exp \left\{ j\eta - \frac{j4\pi}{\lambda_g}(l-r_1) \right\} \exp (jmn\theta) \tag{3}$$

when $|R|$ is the amplitude of the reflection coefficient of the rotating disk and $\eta$ is the phase of the reflection coefficient of the rotating disk.

The term of the phase $\dot{R}$ is turned linearly by means of the angle, and when $$\frac{2\pi}{m} = \theta$$

the angle $\theta$ will be repeated $m$ times while the rotating disk makes a round and the change of the term of phase $\dot{R}$ is, as it is shown in FIG. 3 (here $m$ is taken as 2 for example) the repetition of $m$ times of the linear changes varying from $$\eta - \frac{4\pi}{\lambda_g}(l-r_1) \text{ to } \eta - \frac{4\pi}{\lambda_g}(l-r_1) + 2\pi\eta \qquad 5$$

When the rotating disk is turned $p$ times in a second, the changing part of the phase represents that the change from 0 to $2\pi$ is repeated $m.n.p.$ times in a second. That is to say, in this way a reflection phase shifter, of which the change of phase is linear and fluctuates at a high speed, can be obtained. In this case, there occurs but little error when $n=1$, even at the application for wider band area (e.g. 5% band) and the position of the insertion of the rotating disk does not need to be exactly at the center of the waveguide. Further, the waveguide at the slit part can be in a taper form and its height can be made small. The rotating disk can be replaced with metal one or resistance disk etc.

FIG. 4 shows a direct plotter for impedance in which the above described phase shifter is employed. This plotter includes an electrical micro-wave source 5, which transmits through a unidirectional guide 6 into one arm of a magic T junction 7. An impedance load under test 8 is connected to another arm of the junction 7. A phase shifter 9, such as the phase shifter of FIGS. 1 and 2 is connected to the opposite arm of the junction 7, and is operated by means of a synchronous motor 10. The remaining arm of the magic T junction is connected, via a second unidirectional guide 11 to a square law detector 12. The output of the square law detector passes through a filter 13 and an audio amplifier 14 to the vertical and horizontal deflection control terminals of a cathode ray tube such as a Braun tube 15. By impressing narrow positive voltage pulses on the control grid 16 of the tube in proper synchronism with the adjustment of the phase shifter 9, bright spots are produced and the complex impedance of the impedance load 8 can be read directly on the fluorescent screen of the tube. These narrow pulses are generated in a reference signal generator 17 which receives its power from any commercial source 18. For the following analysis, the magic T junction 7 is considered to be in ideal condition.

When the output from the micro-wave source is A, and the voltage reflection coefficient is, when the impedance under test is observed from the center of magic T:

$$\dot{R}_x = |R| \exp.(j\eta x) \qquad (4)$$

and when the reflection coefficient on the side of the reflection phase shifter 9 is:

$$\dot{R} = +|R| \exp.(j\eta_0) \exp.(jmn\theta) \qquad (5)$$

when $$\eta_0 = \eta - \frac{4\pi}{\lambda_g}(l-r_1)$$

In compliance with the Formula 3 the input to the square detector 12 is proportional to the following formula with reference to the Formulae 4 and 5

$$\dot{\Psi} \frac{1}{2} \dot{A}[|R_x| \exp.(j\eta x) - |R| \exp.(j\dot{\eta}_0) \exp.(jmn\theta)] \qquad (6)$$

When the rotating disk of the phase shifter 9 is turned $p$ times in a second, the phase of the second term in brackets of the Formula 6 repeats, as described above, the changes from $\eta_0$ to $(\eta_0+2\pi)$ in every second $(m.n.p.)$. So when the value of the Formula 6 is square-detected and is taken up through a narrow band filter 13, at which the value $(m.n.p.)$ is the center frequency, the output voltage V is:

$$\dot{V} = \frac{1}{2}|A|^2 \cdot K \cdot |R| \cdot |R_x| \cos\{2\pi(mnp) + \eta_0 - \eta_x\} \qquad (7)$$

K = proportionality constant

Therefore when this voltage is impressed on the oscilloscope 15 of FIG. 4, the phases $|\dot{R}_x|$ and $(\eta_6-\eta_x)$ can be read directly and in consequence the impedance $R_x$ and further the impedance $$Z_x = \frac{1+\dot{R}_x}{1-\dot{R}_x}$$

can be read directly. $\eta_0$ Can be taken away at the correction and neglected. Thus, according to the layout of the circuits after FIG. 4, a direct plotter for impedance with a very simple structure can be obtained.

As a further application of the present invention, it provides an impedance plotter for wider band area. It is desired, generally speaking, in super high frequency wave guide circuits, that the plotter for direct reading of frequency characteristics of complex impedance on a Smith chart be a device with minimum error for wide band area and at the same time the reference plane for measurement be movable at will.

Although this problem has been solved to a certain extent with the introduction of directional phase plotter for micro-wave and semi-micro-wave band areas, still no perfect and practical impedance plotter for wide band area was known hitherto. The present invention offers a perfect and practical plotter for wide band area. By means of this plotter, it is now possible to measure with an extremely small, negligible error, the frequency characteristics of complex impedance of the impedance load being tested, in combination with a sweep frequency oscillator and it enables further a direct reading of said characteristics.

FIG. 5 shows a block diagram of the circuit layout of another embodiment of the present invention. As in the previous embodiment, there is provided a micro-wave source 5 which is connected to one arm of a magic T junction 7. An impedance load 8 to be tested is connected to another arm of the junction while a phase shifter 9 of the reflection type is connected to the opposite arm. A synchronous motor 10 drives the phase shifter 9. In the present arrangement there is also provided a light source 20, on one side of the phase shifter 9 and a photoelectric converter 21 on the opposite side. Referring now to FIGS. 6 and 7 it will be seen that when the rotating disk 2 is in a certain angular position relative to the waveguide 1, an arcuately shaped opening 22 in the disk will come into alignment with holes 23 in the guide to permit light from the source 20 to energize the converter 21.

Through this arrangement a rectangular wave voltage synchronized with the revolution of the rotating disk 2 can be obtained. In the system of FIG. 5 there is also provided a square law detector 12 whose output is connected through blocking condenser 25 to the switching terminal of a chopper 26. The chopper is energized by the output voltage of the light converter 22. Phase circuits 27 and 28 are provided for +45° and −45° respectively (±45° against the frequency which is twice as much as the revolution of the rotating disk of the phase shifter 4). A further circuit 29 is provided to respond to the sum of the two chopper output voltages. In other words, the phase circuits 27 and 28 function as time division circuits, and together with the further circuit 29 they serve as phase composing circuits. A narrow band filter 30 is provided and has a pass frequency equal to twice the rotational frequency of the rotating disk 2 of the phase shifter 9. An oscilloscope 31 is provided for direct reading of the measured impedance. The signals passing through the narrow band filter 30 are amplified in a low frequency amplifier 32 and are impressed upon the vertical and horizontal beam deflection terminals of the oscilloscope 31. At the same time, narrow positive pulses, synchronized with the rotation of the disk 2 of the phase shifter 9 are impressed upon the control grid 32 of the scope whereby bright spots are produced and the complex impedance of the impedance load 8 appears for direct reading on the fluorescent screen of the tube. A pulse generator 33 is arranged to generate the necessary voltage pulses and is connected to a commercial electric source 34 which provides the necessary electrical power. This same source drives the synchronous motor 10.

As in the previous case, the analysis of the present circuit presumes the magic T junction to be in ideal condition. As shown in FIG. 7, the rotating disk 2 is so arranged that the radius $r$ and $r'$ satisfy the following formulae when $\lambda_g$ is the guide wave length at the designed center frequency:

$$r = \left(r_1 + \frac{\lambda_g}{4} + \frac{\lambda_g}{2\pi}\varphi\right) \cdots \left(-\frac{\pi}{2} < \varphi < \frac{\pi}{2}\right)$$

$$r' = \left(r_1 + \frac{\lambda_g}{4} + \frac{\lambda_g}{8} + \frac{\lambda_g}{2\pi}\varphi'\right) \left(-\frac{\pi}{2} < \varphi' < \frac{\pi}{2}\right) \quad (8)$$

$\varphi$ and $\varphi'$ are the radians in clockwise direction from a given starting point.

In an analogue way as described above and in conformity with the further development of aforementioned formulae, $R = |R_x| \exp. j\eta x$ and therefore the required impedance $$\dot{Z}_x = \frac{1 + \dot{R}_x}{1 - \dot{R}_x}$$

can be read directly.

The measuring error is represented by the term $\pi\delta^2/8$ when $\delta$ means the parameter reflecting the frequency characteristic and the output voltage at the filter 4 is:

$$V_3 = V_1\left(2p + \frac{\pi}{4}\right) + V_2\left(2p - \frac{\pi}{4}\right)$$

$$Z = \frac{1}{2}K'|R||R_x|\left\{2 - \left(\frac{\pi\delta}{6}\right)^2 - \left(\frac{\pi\delta}{8}\right)\cos 2(\eta - \eta_x)\right\}$$

$$\times \cos\left\{2\pi 2pt + (\eta - \eta_x) + \frac{\pi\delta^2}{8}\sin 2(\eta - \eta_x)\right\} \quad (9)$$

where
$V_1$ = input voltage to the phaser 11
$V_2$ = input voltage to the phaser 12
$V_3$ = output voltage at filter 4
$K'$ = sensibility of detection
$\delta$ = difference between the guide wave length in consideration and the designed center guide wave length.
$\eta$ may be deleted at the calibration in advance.

When the frequency band area 11 to 12% is taken up, being $|\delta| < 0.1$, the value of $\pi\delta^2/8$ will be less than 0.04. Hence the error in 11 to 12% area:

Percentage error ... of $|R_x|$ _____ <0.4
$\eta_x$ error _____ <0.23°

So it is evident that the amplitude error and phase error are extremely small in the wide band area.

The above described device offers in consequence an impedance plotter of simple structure, but still characterized by high accuracy over a wide band area; and it is therefore applicable to the measuring of millimeter and centimeter waves, where the dimension of waveguide has to be very compact.

As described above, the phase shifter according to the present invention plays a very particular function even over a wide range of frequencies and the combination of this phase shifter with a magic T and band pass filter provides a direct plotter of impedance with high accuracy and sensitivity.

Although particular embodiments of the invention are herein disclosed for purposes of explanation, further modifications thereof, after study of this specification, will be apparent to those skilled in the art to which the invention pertains. Reference should accordingly be had to the appended claim in determining the scope of the invention.

What is claimed and desired to be secured by Letters Patent is:

1. A micro-wave impedance measuring device comprising a phase shifter including a waveguide capable of supporting micro-wave modes having transverse electric fields, a rotating disk mounted about an axis perpendicular both to the direction of propagation through said waveguide and to said transverse electric field, said disk having an electrically conductive periphery, the radius of said disk increasing in one sector from a minimum radius $$r_1 \text{ to } r_1 + \frac{\lambda_g}{2}$$

and in the other sector from $$r_1 + \frac{\lambda_g}{2} \text{ to } r_1 + \frac{\lambda_g}{8} + \frac{\lambda_g}{2}$$

where $\lambda_g$ is the guide wavelength, a source of micro-wave energy for generating waves at $\lambda_g$, means directing said energy to both said phase shifter and to an impedance to be determined, a detector element arranged to receive simultaneous signals reflected from both said phase shifter and said impedance, a pair of signal phase shift circuits having phase shift characteristics which differ by 90°; a switch arranged to operate synchronously with the rotation of said disk, said switch arranged to connect output signals from said detector element alternately through said two phase shift circuits respectively as said sectors of said disk rotate past a given point, a phase composing circuit including ±45° delay circuits connected to receive signals from each of said phase shift circuits and means for comparing the time relation of signals from said phase composing circuit with the position of said rotating disk.

References Cited

UNITED STATES PATENTS

| | | | |
|---|---|---|---|
| 2,615,958 | 10/1952 | Phillips | 324—58 |
| 2,649,570 | 8/1953 | Radcliffe | 324—58 |
| 2,683,855 | 7/1954 | Blitz | 333—21 |
| 2,773,254 | 12/1956 | Engelmann | 333—31 |
| 2,760,156 | 8/1956 | Fletcher | 324—58 |
| 2,779,003 | 1/1957 | Allen et at. | 333—31 |
| 3,005,985 | 10/1961 | Cohn et al. | 333—31 |
| 3,218,549 | 11/1965 | Tsuchiya | 324—58 |

OTHER REFERENCES

Houston Instruments Corp., Bulletin 1063SG88, received September 1964.

RUDOLPH V. ROLINEC, *Primary Examiner.*

P. F. WILLE, *Assistant Examiner.*

U.S. Cl. X.R.

331—31

UNITED STATES PATENT OFFICE
CERTIFICATE OF CORRECTION

Patent No. 3,443,216                                                 May 6, 1969

Shoji Tsuchiya et al.

It is certified that error appears in the above identified patent and that said Letters Patent are hereby corrected as shown below:

Column 2, line 42, equation (2), "O" should read -- $\theta$ --. Column 3, line 70, "V" should read -- $\dot{V}$ --. Column 4, line 1, "$R_x$" should read -- $\dot{R}_x$ --. Column 5, line 19, "R", first occurrence, should read -- $\dot{R}$ --.

Signed and sealed this 21st day of April 1970.

(SEAL)
Attest:

Edward M. Fletcher, Jr.                             WILLIAM E. SCHUYLER, JR.
Attesting Officer                                                     Commissioner of Patents